United States Patent
Kitsugi et al.

(10) Patent No.: US 7,893,970 B2
(45) Date of Patent: Feb. 22, 2011

(54) INFORMATION INPUT APPARATUS THAT REPRODUCES SOUND CORRESPONDING TO A PICTURE RANGE

(75) Inventors: Yasuo Kitsugi, Ohmiya (JP); Akira Ohmura, Kawasaki (JP)

(73) Assignee: Nikon Corporation, Tokyo (JP)

( * ) Notice: Subject to any disclaimer, the term of this patent is extended or adjusted under 35 U.S.C. 154(b) by 949 days.

(21) Appl. No.: 11/271,837

(22) Filed: Nov. 14, 2005

(65) Prior Publication Data

US 2006/0061671 A1    Mar. 23, 2006

Related U.S. Application Data

(63) Continuation of application No. 09/905,942, filed on Jul. 17, 2001, now abandoned, and a continuation of application No. 08/873,888, filed on Jun. 12, 1997, now abandoned.

(30) Foreign Application Priority Data

Jun. 13, 1996    (JP)    ................................ 08-152220

(51) Int. Cl.
  *H04N 5/76*    (2006.01)
  *G03B 17/24*    (2006.01)

(52) U.S. Cl. .................................... 348/231.4; 396/312
(58) Field of Classification Search ............ 348/231.99, 348/231.3, 231.4; 396/310, 312
See application file for complete search history.

(56) References Cited

U.S. PATENT DOCUMENTS

| | | | |
|---|---|---|---|
| 4,531,161 A | 7/1985 | Murakoshi | |
| 5,099,262 A | 3/1992 | Tanaka et al. | |
| 5,583,791 A * | 12/1996 | Harigaya et al. | ............ 348/575 |
| 5,610,723 A * | 3/1997 | Yamagishi | .................... 386/75 |
| 5,614,946 A | 3/1997 | Fukuoka | |
| 5,731,852 A * | 3/1998 | Lee | ............................ 348/719 |
| 5,806,072 A | 9/1998 | Kuba et al. | |
| 5,815,201 A * | 9/1998 | Hashimoto et al. | ....... 348/231.4 |

* cited by examiner

*Primary Examiner*—Timothy J Henn
(74) *Attorney, Agent, or Firm*—Oliff & Berridge, PLC

(57) ABSTRACT

An electronic camera records pictures and sound associated with the picture images, and enables reproduction of selected picture images. When one of the picture images of a range of continuously-shot picture images is reproduced, the sound corresponding to the entire range of continuously-shot picture images is reproduced.

23 Claims, 7 Drawing Sheets

INFORMATION INPUT APPARATUS THAT REPRODUCES SOUND CORRESPONDING TO A PICTURE RANGE

INCORPORATION BY REFERENCE

This is a Continuation of application Ser. No. 09/905,942, filed Jul. 17, 2001 which claims priority of application Ser. No. 08/873,888, filed Jun. 12, 1997, which claims priority of Japanese Patent Application No. 08-152220, filed Jun. 13, 1996, the entire disclosures of which are hereby incorporated by reference herein in their entirety.

BACKGROUND OF THE INVENTION

1. Field of Invention

The present invention relates to an information input apparatus for use, for example, in an electronic camera or the like which records the image of an object after converting the image into digital data.

2. Description of Related Art

In recent years, use of electronic cameras which shoot the image of an object using a CCD or the like, and which record the image in an internal memory, such as an IC or removable memory cards, or the like, after converting the image into digital data, is becoming common in place of cameras which use film. An image which is photographed with such an electronic camera may be retrieved immediately and be displayed on the screen of an LCD or the like without developing and printing processes required by a conventional camera.

Moreover, an electronic camera is compatible with personal computers because the electronic camera records the photographed image as digital data, and hence an electronic camera is often used as an input device for personal computers. For example, an electronic camera is often used as a tool to input image data in creating a home page for the Internet. In addition, electronic cameras are capable of continuously shooting the picture image of an object.

Certain electronic cameras are also capable of recording sound in conjunction with picture images of the object being shot. When one picture image is reproduced, the sound associated with the picture image is also output.

However, when a picture image is one of many continuously shot picture images, a problem arises that the time during which the sound associated with this picture image was recorded is relatively short. For example, when a picture image is one of a set of picture images continuously shot at a rate of 8 frames per second, the time during which the sound associated with each recorded picture image is one-eighth of a second.

SUMMARY OF THE INVENTION

The information input apparatus of the present invention overcomes the disadvantages of the related art and outputs sound corresponding to the picture image being reproduced such that the user does not notice a difference.

The information input apparatus of the present invention comprises imaging means for imaging a picture image and sound input means for inputting sound. A memory stores the picture image imaged by the imaging means and the sound corresponding to the picture image input by the sound input means, with an association between the two. The memory also stores a continuously shot picture image comprised of a plurality of picture images imaged continuously in a predetermined length of time by the imaging means and the associated sound input by the sound input means during the predetermined length of time. Picture image reproduction means reproduces the picture images stored in the memory means, and sound reproduction means reproduces the sound stored in the memory means. Selection means enables selection of a prescribed choice of picture images stored in the memory means, and control means controls the components so that when a prescribed choice of picture images stored in the memory means is selected by the selection means, the picture image reproduction means reproduces the selected picture image and the sound reproduction means reproduces the sound corresponding to the continuously shot picture image having this picture image as a constituent element.

In addition, the apparatus may be such that the sound is stored in the memory means with an association to each of the picture images that compose the continuously shot picture image.

The apparatus may also be such that the control means accomplishes control so that when one of the picture images that compose the continuously shot picture image is selected by the selection means, the sound reproduction means reproduces the sound corresponding to the continuously shot picture image from the start.

In addition, the apparatus may be such that the control means accomplishes control so that when one of the picture images other than the picture image imaged first is selected by the selection means out of the picture images that compose the continuously shot picture image, the sound reproduction means reproduces the sound corresponding to the continuously shot picture image from the middle.

The apparatus may also be such that the memory stores predetermined information indicating whether or not a picture image is one of a continuously shot picture image.

In another aspect, the apparatus may further comprise a display for displaying the picture images imaged by the imaging means and the picture images reproduced by the picture image reproduction means, and sound output means for outputting the sound input by the sound input means and the sound reproduced by the sound reproduction means.

The apparatus may also include illumination means for emitting illuminating light toward the object.

In the information input apparatus of the present invention, control is accomplished by the control means so that when a prescribed picture image of the picture images stored in the memory means is selected by the selection means, the picture image reproduction means reproduces the selected picture image and the sound reproduction means reproduces the sound corresponding to the continuously shot picture image of which the picture image is a constituent element. Accordingly, when one of the picture images that compose a continuously shot picture image is reproduced, all of the sound recorded during the continuous shooting can be reproduced.

DETAILED DESCRIPTION OF PREFERRED EMBODIMENTS

Figure 1:
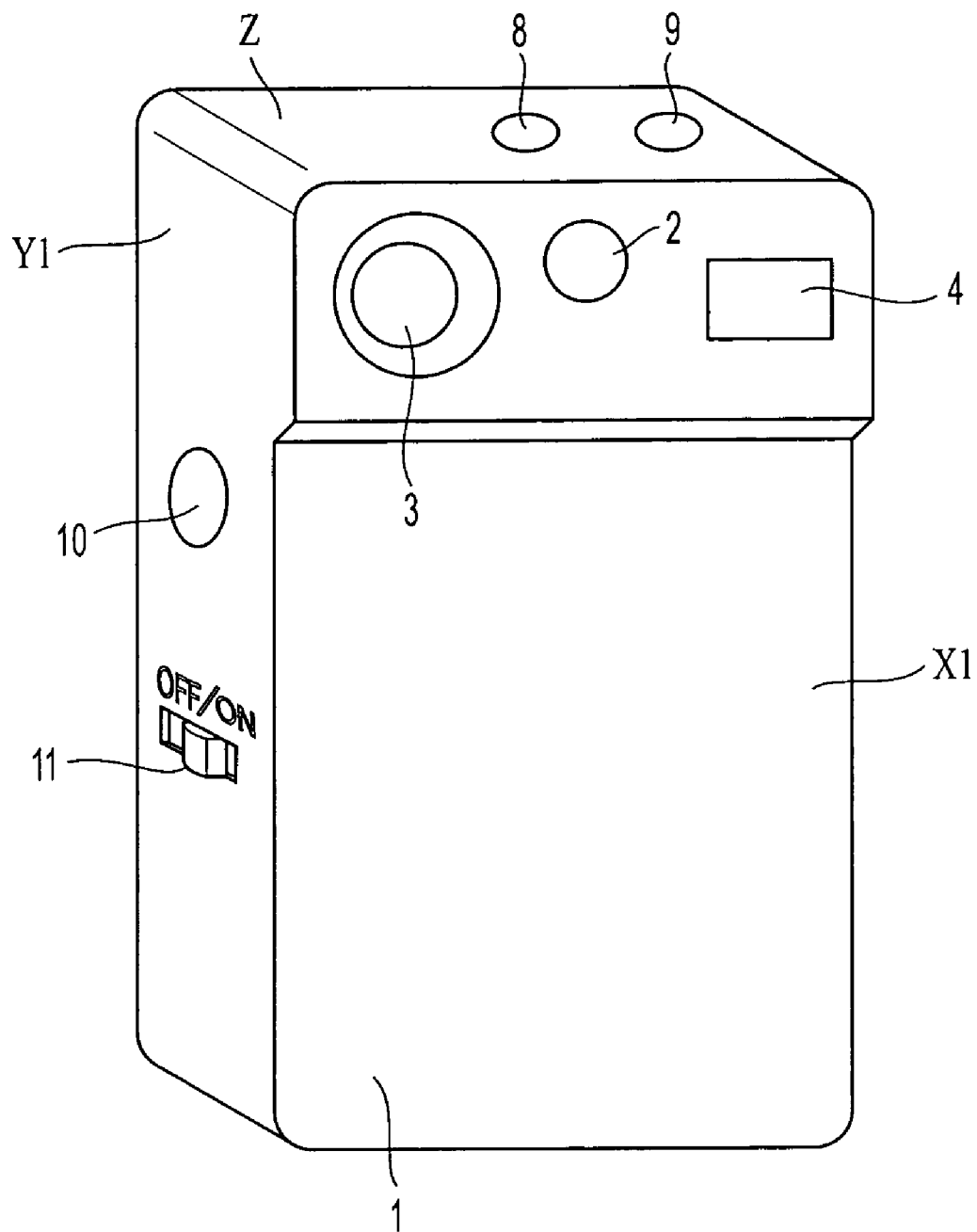
FIG. 1 is a front perspective view of an embodiment of an electronic camera of the present invention.
Figure 2:
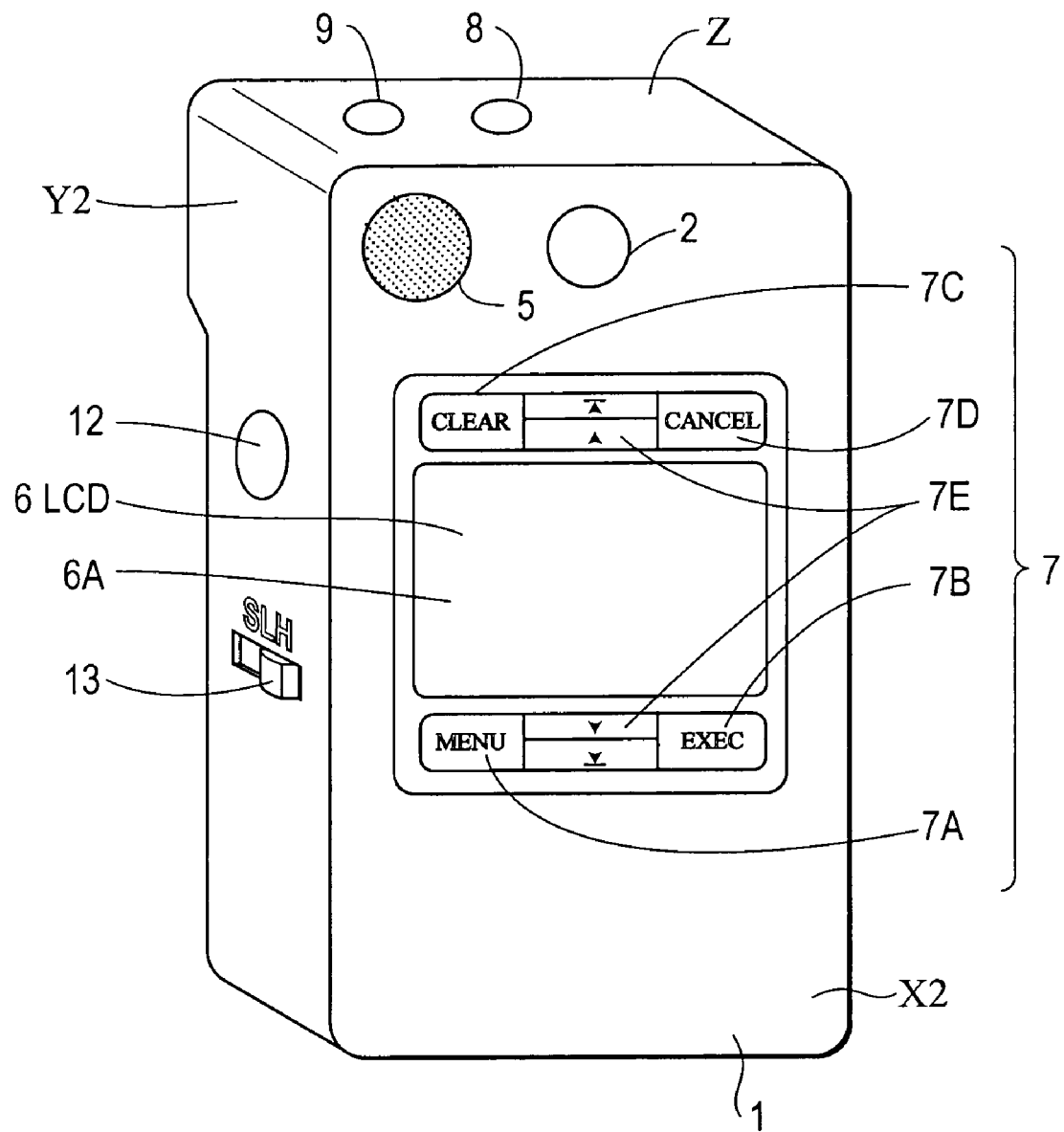
FIG. 2 is a rear perspective view of the electronic camera shown in FIG. 1.

The electronic camera of the present invention is shown in FIGS. 1 and 2. For purposes of orientation, surface X1 faces the object when an object is photographed and surface X2 faces the user. As shown in FIG. 1, the top edge section of the surface X1 includes a viewfinder 2 which is used to verify the shooting range of the object, a shooting lens 3 which takes in the optical image of the object, and a light-emitting unit (strobe) 4 which emits light to illuminate the object.

The top edge section of surface X2, as shown in FIG. 2, includes an opposite end of viewfinder 2 and a speaker 5. Speaker 5 outputs sound corresponding to sound data recorded on a memory card or the like installed in electronic camera 1. Moreover, an LCD 6 and operation keys 7 are formed in surface X2 below viewfinder 2, shooting lens 3, light-emitting unit 4, and speaker 5. On the surface of LCD 6, a touch tablet 6A is formed which outputs position data corresponding to the position designated by the touching operation of a designated pen-type pointing device or pen 6B.

Touch tablet 6A is made of transparent material such as glass or resin, and allows the user to view an image being displayed on LCD 6, which is formed inside touch tablet 6A, through touch tablet 6A.

Operation keys 7 include a plurality of keys corresponding to a plurality of functions as described hereafter. The keys may be operated by pen 6B and are used to reproduce recording data such as image data, sound data or text data recorded on the internal memory card and to display such on LCD 6. For example, a menu key 7A is operated to display a menu screen on LCD 6. An execution key 7B is operated to produce recording data selected by the user. In addition, a clear key 7C is operated to erase the recording data, a cancel key 7D interrupts the reproduction process of the recording data, and a scroll key 7E scrolls the screen vertically when a table composed of the recording data is displayed on LCD 6.

A microphone 8 to gather sound and an earphone jack 9 to which an earphone (not shown) is connected are provided in top surface Z of electronic camera 1.

A release switch 10 which is operated in shooting an object and a power source switch 11 which switches the power source on and off are provided on left side surface Y1. Release switch 10 and power source switch 11 are arranged below viewfinder 2, shooting lens 3, and light-emitting unit 4.

A sound recording switch 12, which invokes sound recording, and a continuous shooting mode switch 13, which allows switching of the continuous shooting mode during shooting are provided in right side surface Y2 opposite surface Y1. Like previously described release switch 10 and power source switch 11, sound recording switch 12 and continuous shooting mode switch 13 are arranged below viewfinder 2, shooting lens 3, and light-emitting unit 4. Moreover, sound recording switch 12 is formed substantially at the same height as release switch 10 on surface Y1, so that the user does not feel a difference when the camera is held either by the right hand or the left hand.

Alternatively, the height of sound recording switch 12 and release switch 10 may differ so that when the user presses one switch, the switch provided in the opposite side surface is not accidentally pressed by the fingers of the user holding the other side surface.

Continuous shooting mode switch 13 is used to set shooting of one frame or shooting of several frames of the object when release switch 10 is pressed. For example, if the indicator of continuous shooting mode switch 13 is switched to the "S" position or mode, only one frame is shot when release switch 10 is pressed. Moreover, if the indicator of continuous shooting mode switch 13 is switched to the "L" position or mode and release switch 10 is pressed, the camera shoots eight frames per second while release switch 10 is pressed. In other words, shooting is accomplished under the low speed continuous shooting mode. Furthermore, if the indicator of continuous shooting mode switch 13 is switched to the "H" position or mode and release switch 10 is pressed, the camera shoots 30 frames per second while release switch 10 is pressed. In other words, shooting is accomplished under the high speed continuous shooting mode.

Figure 3:
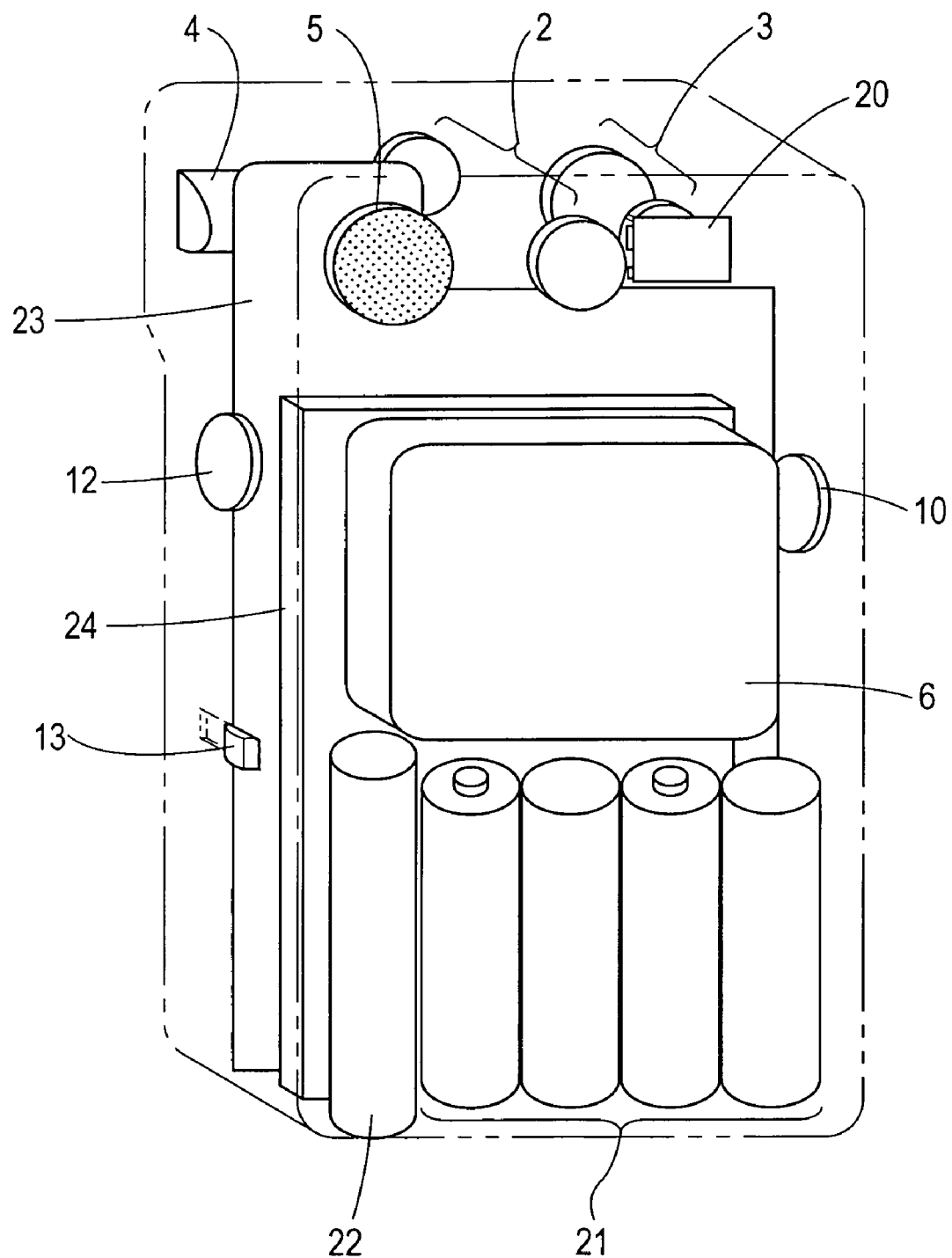
FIG. 3 is a perspective view showing the internal composition of the electronic camera shown in FIG. 2.

Next, the internal structure of electronic camera 1 will be described with respect to FIG. 3. A CCD 20 is provided in the rear step (surface X2 side) of shooting lens 3 and the optical image of the object imaged through shooting lens 3 is photoelectrically converted into an electric signal (picture image signal) and output.

Four cylindrical batteries (AAA dry cell batteries) 21 are placed side by side below LCD 6 and the electric power stored in batteries 21 is supplied to each part. Moreover, a capacitor 22 is provided next to batteries 21 to accumulate electric charge necessary to cause light-emitting unit 4 to emit light.

Various control circuits are formed on circuit board 23 to control each part of electronic camera 1. Moreover, a removable memory card (recording medium) 24 is provided between circuit board 23 and LCD 6 and batteries 21, so that various information which is to be input into electronic camera 1 is recorded in the preassigned regions of memory card 24.

Moreover, in the present embodiment, memory card 24 is removable, but a memory on which various information can be recorded may be provided on the circuit board 23. Moreover, various information recorded on memory card (or memory) 24 can also be output to an external personal computer or the like through an unrepresented interface.

Figure 4:
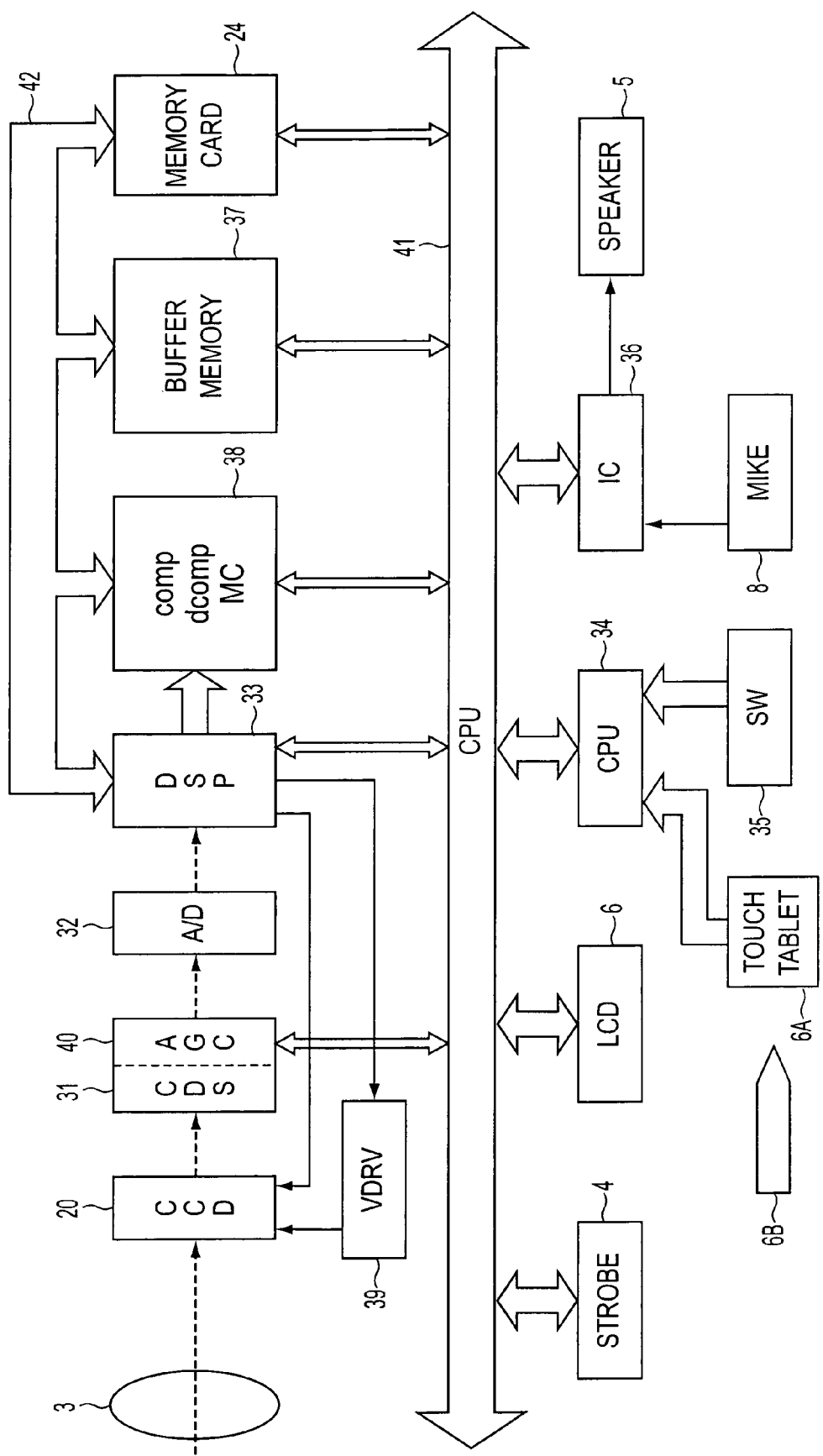
FIG. 4 is a block diagram showing the electrical circuitry of the electronic camera shown in FIG. 1.

Next, an example of the internal electrical structure of the electronic camera of the present embodiment will be described with reference to FIG. 4. CCD 20, which is equipped with a plurality of pixels, photoelectrically converts the optical image imaged on each pixel into an image signal (electric signal). A CCD driving circuit (VDRV) 39 is controlled by a digital signal processor (hereafter, DSP) 33, and drives CCD 20.

A correlation double sampling circuit (CDS) 31 samples the picture image signals photoelectrically converted by CCD 20 with a preset timing. An AGC (automatic gain control circuit) 40 controls the gain of the signals sampled by CDS 31. An analog/digital (A/D) conversion circuit 32 digitizes the picture image signals sampled by CDS 31, and supplies the result to DSP 33.

DSP 33 supplies the picture image data that has been digitized to a buffer memory 37, causing the information to be stored in memory. A memory control circuit 38 reads the picture image data stored in buffer memory 37, and after being compressed by a JPEG (Joint Photographic Experts Group) format, for example, is supplied to memory card 24 via data bus 42, and is recorded in a preset picture image recording region.

In addition, CPU 34 has an internal timer circuit (not shown) and records the information about the date and time of shooting in the picture image recording region of memory card 24 as header information for the picture image data. As a result, the shooting date and time data are added to the picture image data recorded in the picture image recording region of memory card 24.

Microphone 8 inputs sound and supplies an analog sound signal corresponding to this sound to a sound IC 36. Sound IC 36 converts the sound signal into a digital sound signal and, after compressing this signal, supplies the result to memory card 24 where the data is recorded in a predetermined sound recording region. In addition, at this time the recording date and time data are recorded in the sound recording region of memory card 24 as header information for the sound data.

In addition, strobe 4 is controlled by CPU 34 and emits light with a preset timing to illuminate the object.

When a preset position on touch tablet 6A is pressed by pen 6B operated by the user, CPU 34 reads the X-Y coordinates corresponding to the position pressed on touch tablet 6A, and accumulates this coordinate data (comprising the below-described line drawing information) in an unrepresented predetermined memory. In addition, CPU 34 supplies the line drawing information accumulated in the memory to memory card 24 along with header information such as the date and time when the line drawing information was input, and records this information in the line drawing information recording region.

A buffer memory 37 and LCD 6 are connected to CPU 34 via a CPU control bus 41, and the picture image corresponding to the picture image data stored in buffer memory 37 can be displayed on LCD 6. However, the picture image data that has undergone compression processing is input into memory control circuit 38 once and after being decompressed is then supplied to buffer memory 37 via data bus 42.

In addition, a speaker 5 is connected to sound IC 36 and the sound data read from memory card 24 is decompressed and converted into an analog sound signal by sound IC 36, and is then output by speaker 5 or to an unrepresented earphone connected to earphone jack 9.

In addition, when the operation switch (SW) and a switch such as release switch 10, power source switch 11, sound recording switch 12, or continuous shooting mode switching switch 13 are operated, a signal corresponding to this operation is supplied to CPU 34. Furthermore, CPU 34 executes the corresponding predetermined process when the switches are operated.

Next, these actions will be described. First, the sound input and output process in the present embodiment will be described. When the power source switch shown in FIG. 1 is switched to "ON", power is supplied to electronic camera 1, and when sound recording switch 12 provided on surface Y2 is pressed, the recording process is started. The sound input via microphone 8 is converted into digital sound data by sound IC 36, and after a compression process has been performed, the data is supplied to memory card 24 and is recorded in the sound recording region of memory card 24. At this time, data such as the recording date and time is recorded as header information for the compressed sound data in the sound recording region of memory card 24. This kind of action is repeatedly executed while sound recording switch 12 is pressed.

A PCM (Pulse Code Modulation) method or some other method can be used as the sound compression method.

Next, the actions involved in shooting an object will be described. First, the case when continuous shooting mode switching switch 13 provided in surface Y2 is switched to the S mode (the mode that accomplishes shooting of only one frame) will be described. First, as shown in FIG. 1, power is supplied to electronic camera 1 when the power source switch provided on surface Y1 is switched to "ON". When the object is verified using viewfinder 2 and release switch 10 provided on surface Y1 is pressed, the object shooting process is started.

The optical picture image of the object observed using viewfinder 2 is condensed by shooting lens 3 and is composed into an image on CCD 20 provided with a plurality of pixels. The optical picture image of the object imaged on CCD 20 is photoelectrically converted into a picture image signal in each pixel and is sampled by CDS 31. The picture image signal sampled by CDS 31 has the gain thereof controlled by AGC 40, and is supplied to A/D conversion circuit 32 and is digitized and then supplied to DSP 33.

DSP 33 supplies the digitized picture image data to buffer memory 37 where this data is stored. Memory control circuit 38 compresses the picture image data read from the buffer memory in accordance with the JPEG format that is a combination of the discrete cosine transformation, quantization and Huffman encoding. Memory control circuit 38 supplies the compressed picture image data to memory card 24 via data bus 42. Memory card 24 records the picture image data supplied from memory control circuit 38 in the picture image recording region. At this time, the shooting date and time data is recorded as header information for the above-described picture image data in the picture image recording region of memory card 24.

When continuous shooting mode switch 13 is switched to the S mode, one frame of shooting is accomplished each time release switch 10 is pressed. Accordingly, even if release switch 10 is pressed and continuously held in this pressed position, only shooting of one frame is accomplished. In addition, when release switch 10 is continuously pressed for only a predetermined length of time, it is possible for the picture image just shot to be displayed on LCD 6.

Next, the case wherein continuous shooting mode switch 13 is switched to the L mode (the mode that accomplishes continuous shooting of 8 frames per second) will be described. Power is supplied to electronic camera 1 when power source switch 11 is switched to "ON", and when release switch 10 provided on the surface Y1 is pressed, the object shooting process is started as follows.

The light from the object observed using viewfinder 2 is condensed by shooting lens 3, and is composed into an image on CCD 20 provided with a plurality of pixels. The optical picture image of the object imaged on CCD 20 is photoelectrically converted into a picture image signal in each pixel and is sampled by CDS 31 at a rate of eight times per second. In addition, of the picture image electrical signals corresponding to all of the pixels from CCD 20, CDS 31 at this time thins out those corresponding to three-fourths of the pixels.

The picture image signals sampled by CDS 31 (the picture image signals of one-fourth of all the pixels of CCD 20) are supplied to A/D conversion circuit 32, and are digitized and output to DSP 33.

The digitized picture image data is supplied from DSP 33 to buffer memory 37 and is stored. Furthermore, the picture image data stored in buffer memory 37 is read out by memory control circuit 38 and is compressed in accordance with the JPEG format. The picture image data is supplied to memory card 24 via data bus 42, and is recorded in the picture image recording region. At this time, the shooting date and time data is recorded in the picture image recording region of memory card 24 as header information for this picture image data. In addition, predetermined discrimination information indicating that the picture image is one of the continuously shot picture images is inserted into each header information for the picture image data continuously shot. Through this, CPU 34 can discriminate whether or not the picture images recorded on memory card 24 are picture images comprising the continuously shot picture images.

Next, the case wherein continuous shooting mode switch 13 is switched to the H mode (the mode that accomplishes continuous shooting of 30 frames per second) will be described. Power is supplied to electronic camera 1 when the power source switch 11 is switched to "ON", and when release switch 10 provided on the surface Y1 is pressed, the object shooting process is started as follows.

Light from the object observed using viewfinder 2 is condensed by shooting lens 3 and is composed into an image on CCD 20. The optical picture image of the object imaged on CCD 20, which is provided with a plurality of pixels, is photoelectrically converted into a picture image signal in each pixel and is sampled by CDS 31 at a rate of 30 times per second. In addition, of the picture image electrical signals corresponding to all of the pixels from CCD 20, CDS 31 at this time thins out those corresponding to eight-ninths of the pixels.

The picture image signals sampled by CDS 31 (the picture image signals of one-ninth of all the pixels of CCD 20) are supplied to A/D conversion circuit 32, and are there digitized and output to DSP 33.

DSP 33 supplies the digitized picture image data to buffer memory 37 and causes the data to be stored there. Furthermore, memory control circuit 38 reads the picture image data from buffer memory 37 and compresses this in accordance with the JPEG format. In this way, the digitized and compressed picture image data is supplied to memory card 24 via data bus 42, and is recorded in the picture image recording region of memory card along with header information such as the shooting date and time. In addition, predetermined discrimination information indicating that the picture image is one of the continuously shot picture images is inserted into each header information for the picture image data continuously shot, the same as in the L mode. Through this, CPU 34 can discriminate whether or not the picture images recorded on memory card 24 are picture images comprising the continuously shot picture images.

During shooting of the object, strobe 4 operates as necessary to illuminate the object with light.

Next, the actions will be described for the case wherein two-dimensional information (pen input information) is input using touch tablet 6A. When the tip of pen 6B touches touch tablet 6A, data corresponding to the X-Y coordinates of the location that is touched is input to CPU 34. The data corresponding to these X-Y coordinates is supplied to CPU 34, which reads the picture image data corresponding to a point of predetermined size, for example, at the position corresponding to the X-Y coordinates of buffer memory 37 on the basis of this data corresponding to the X-Y coordinates, and through the control from CPU 34, a point of predetermined size is displayed at the corresponding position on LCD 6.

As described above, touch tablet 6A formed on the surface of LCD 6 is composed of a transparent member, and consequently it is possible for the user to observe the point displayed at the position where touch tablet 6A is pressed by the tip of pen 6B on LCD 6, and it is possible to convey a feeling just like accomplishing pen input directly onto LCD 6. In addition, when pen 6B is moved while in contact with touch tablet 6A, a line is displayed on LCD 6 along the locus over which pen 6B moves. Furthermore, when pen 6B is caused to move intermittently on touch tablet 6A, a dashed line is displayed on LCD 6 in accordance with the movement of pen 6B. In this way, the user can input the line drawing information of the desired text or diagram or the like using touch tablet 6A (LCD 6).

In addition, when the picture image is displayed on LCD 6, if line drawing information such as text or the like, for example, is input using pen 6B, this line drawing information is formed by buffer memory 37 along with the picture image information, and is displayed on LCD 6 simultaneously.

The user, by operating an unrepresented color selection switch, can select from among a plurality of colors such as black, white, red, or blue as the color of the line drawing displayed on LCD 6.

After the line drawing information has been input by pen 6B and touch tablet 6A, when execution key 7B is pressed, the line drawing information accumulated in a predetermined memory is supplied to memory card 24 via CPU control bus 41 along with the header information including the input date and time, and is recorded in the line drawing information recording region of memory card 24.

In this way, the line drawing information recorded on memory card 24 is information on which a compression process is executed. The line drawing information input using touch tablet 6A contains a large amount of information with high spatial frequency components, and consequently when the compression process is accomplished using the JPEG format used in compressing the picture image, the compression efficiency is poor and the amount of information is not reduced very much. In addition, compression under the JPEG format is non-reversible compression, and consequently is not suitable for compression of a small amount of line drawing information. This is because when the information is decompressed and displayed on LCD 6, gathers and smears accompanying defects in the information are displayed.

Hence, in this embodiment, the line drawing information is compressed for example using a run length method used in fax machines and the like. The run length method is a method that compresses the line drawing information by scanning the line drawing in the horizontal direction and encoding the length over which the information (points) of various colors such as black, white, red, or blue continue, and the length over which a lack of information (an absence of pen input) continues.

By using this run length method, it is possible to efficiently compress the line drawing information, and in addition, it is possible to suppress defects in the information even when the compressed line drawing information is decompressed. When the amount of information in the line drawing information is relatively low, it is also possible to not compress this.

In addition, when the picture image is displayed on LCD 6, if pen input is performed, the picture image data and the line drawing information input by the pen are combined in buffer memory 37, and the combination image of the picture image and the line drawing is displayed on LCD 6. However, in memory card 24, the picture image data is recorded in the picture image recording region and the line drawing information is recorded separately in the line drawing information recording region. In this way, the two sets of information are recorded in differing regions, and the user can erase either from the combined image of the picture image and the line drawing. In addition, it is possible to compress the picture image information using an individual compression method and to record this information.

Figure 5:
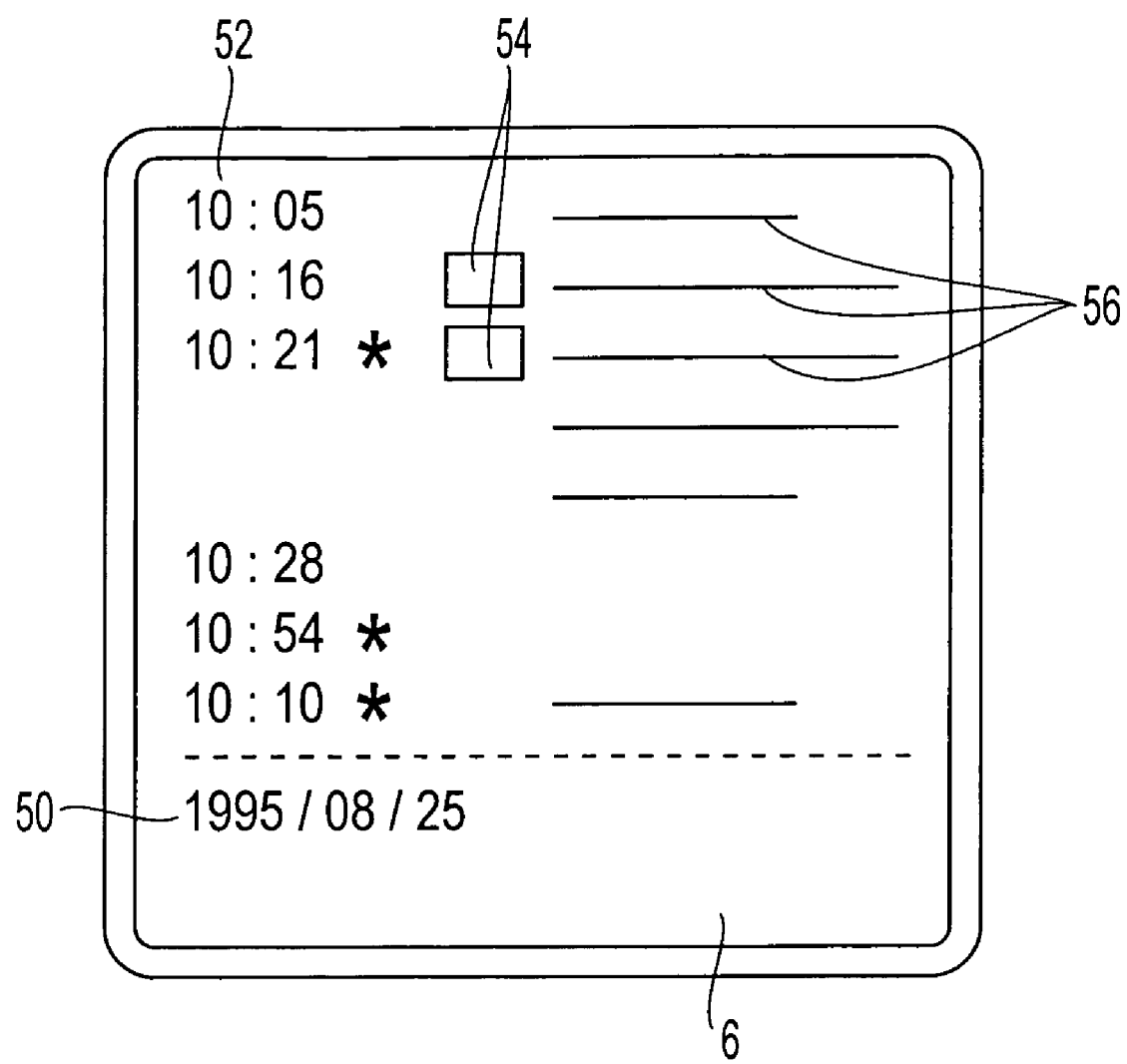
FIG. 5 is a diagram of an example of a display screen of the electronic camera shown in FIG. 2.

When data is recorded on at least one of the sound recording region, the picture image recording region, and the line drawing information recording region of memory card 24, it is possible to display on LCD 6 a table display screen showing a table of the recorded information, as shown in FIG. 5. In the table display screen of LCD 6 shown in FIG. 5, the date 50 when the information was recorded. (in this case, Aug. 25, 1995) is displayed in the lower portion of the screen, and the recording time 52 when the information was recorded on this recording date is displayed on the left-most side of the screen.

To the right of the recording time, a thumbnail picture image 54 is displayed when picture image data is recorded. This thumbnail picture image is a reduced picture image created by thinning the bitmap data of each picture image of the picture image data recorded in memory card 24. Accordingly, the information that the thumbnail picture image displays is information containing the picture image information. That is to say, in the information recorded (input) at "10:16" and "10:25", the picture image information is included, and in the information recorded at "10:05", "10:28", "10:54" and "13:10", the picture image information is not included.

In addition, the memo symbol "★" indicates that a predetermined memo is recorded as line drawing information.

Furthermore, on the right side of the display region for the thumbnail picture image, a sound information bar 56 is displayed, and a bar (line) having a predetermined length corresponding to the time interval during which the sound was recorded is displayed. When sound information has not been recorded, this sound information bar is not displayed.

The user selects the information to be reproduced by pressing the tip of pen 6B in the square region where the desired information is displayed in the screen shown in FIG. 5, and commands the reproduction of the selected information by pressing the tip of pen 6B on execution key 7B shown in FIG. 2.

For example, when the band-shaped region where "10:05" is displayed is pressed by pen 6B on the screen shown in FIG. 5, CPU 34 instructs sound IC 36 to reproduce the sound corresponding to the selected recording date and time (10:05).

The sound IC reads the sound data from memory card 24 in accordance with the command from CPU 34, and after a decompression process has been executed and the information has been converted into an analog signal, the signal is output from speaker 5. When an earphone is connected to earphone jack 9, sound is not output from speaker 5, but is output from the earphone.

When the picture image data recorded on memory card 24 is reproduced, the user selects the information by pressing the desired thumbnail picture image with the tip of pen 6B, and then presses execution key 7B to command reproduction of the selected information.

The picture image data corresponding to the selected thumbnail picture image is read from memory card 24 and is decompressed in memory control circuit 38. The decompressed picture image data is supplied to buffer memory 37 via data bus 42, and is stored in the memory as bitmap data. Next, the control signal corresponding to the picture image data stored in buffer memory 37 is supplied to LCD 6 by CPU 34, and the corresponding picture image is displayed.

At this time, when sound data has also been recorded (for example, in cases where the recording times are "10:16" and "10:21") it is also possible for the sound to be output from speaker 5, as described above.

Figure 6:
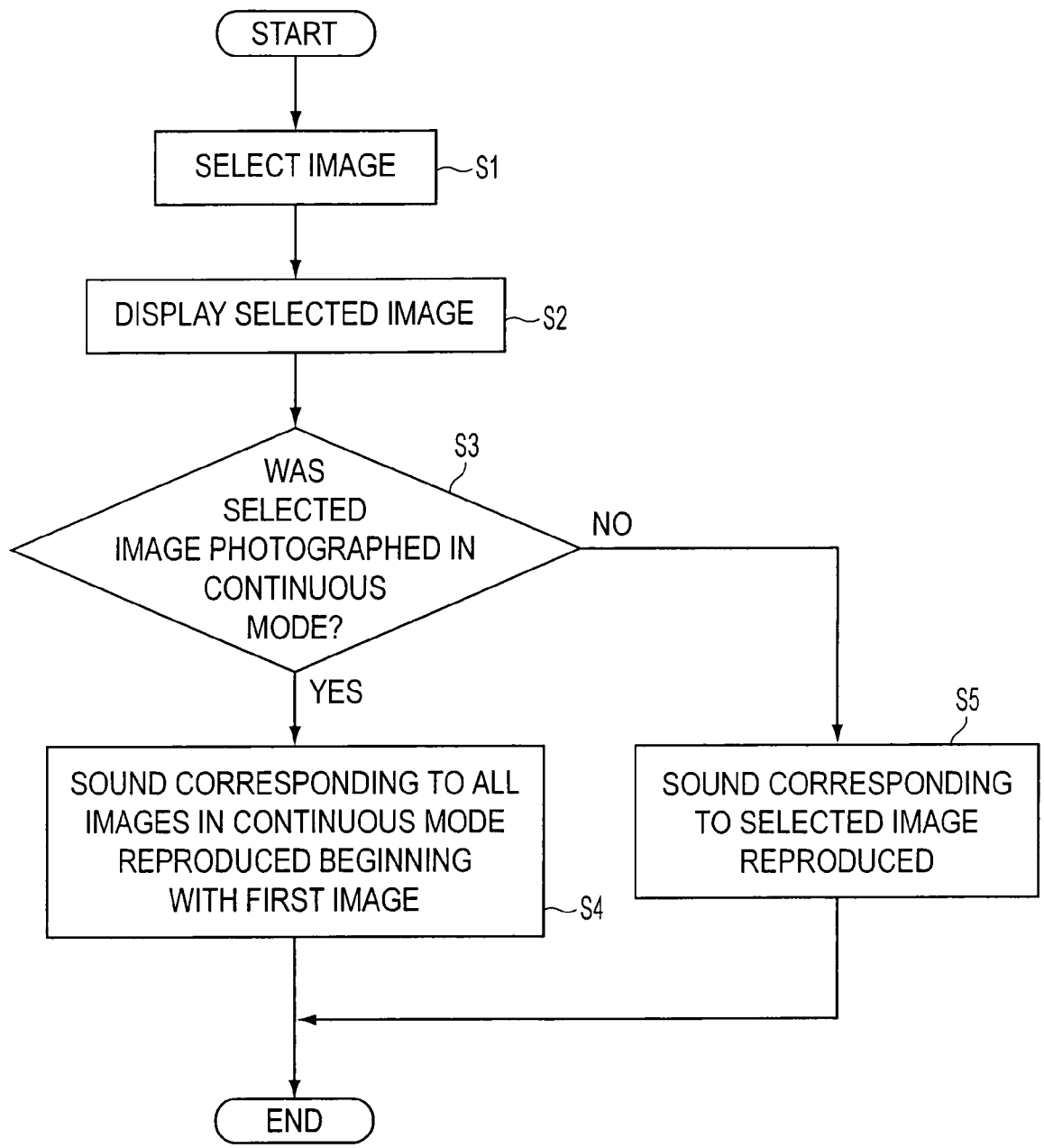
FIG. 6 is a flowchart showing the sequence when one of the picture images comprising a continuously shot picture image is reproduced.

Next, the sequence of actions when picture image data photographed using the continuous shooting mode and stored in memory card 24 is reproduced will be described with reference to the flowchart in FIG. 6.

First, in step S1, the table display screen such as that shown in FIG. 5 is displayed on LCD 6, and the picture image to be reproduced is selected by pressing a predetermined position on touch tablet 6A corresponding to the picture image to be reproduced, using pen 6B or the like. Next, the command to reproduce the picture image just selected is made by pressing on the position on touch tablet 6A corresponding to the position where execution key (EXEC) 7B is displayed, using pen 6B. Touch tablet 6A supplies the position information corresponding to the position pressed by pen 6B to CPU 34.

Next, the sequence moves to step S2 and CPU 34 recognizes the picture image that was selected from the position information supplied from touch tablet 6A, and recognizes that the reproduction of such was commanded. Furthermore, commands are sent to memory control circuit 38 to reproduce the picture image selected in step S1. Memory control circuit 38 reads the picture image data corresponding to the picture image designated for reproduction in accordance with the commands from CPU 34, and stores this in buffer memory 37. Next, memory control circuit 38 executes the decompression process on the picture image data stored in buffer memory 37.

CPU 34 controls LCD 6 on the basis of the decompressed picture image data stored in buffer memory 37, and displays the picture image corresponding to this picture image data on the screen of LCD 6.

In step S3, a determination is made by CPU 34 as to whether or not the picture image displayed on LCD 6 is one of the picture images photographed in the continuous shooting mode ("a continuously shot picture image"). This determination can be made on the basis of preset discrimination information indicating whether or not the image is a continuously shot picture image in the header information corresponding to the picture image data stored in memory card 24.

When the picture image displayed on LCD 6 is determined to be a picture image comprising a continuously shot picture image in step S3, the sequence advances to step S4.

In step S4, CPU 34 commands sound IC 36 to reproduce the sound corresponding to each picture image that comprises the continuously shot picture image photographed using the continuous shooting mode, in order from the sound corresponding to the picture image photographed first. Sound IC 36 reads the sound corresponding to each picture image comprising the continuously shot picture image from memory card 24 in order from the sound corresponding to the picture image photographed first, in accordance with the commands from CPU 34, and accomplishes successive reproduction. That is, after the decompression process has been executed, the information is converted into an analog signal and is output from speaker 5. When an earphone is connected to earphone jack 9, the sound is output through the earphone.

Figure 7:
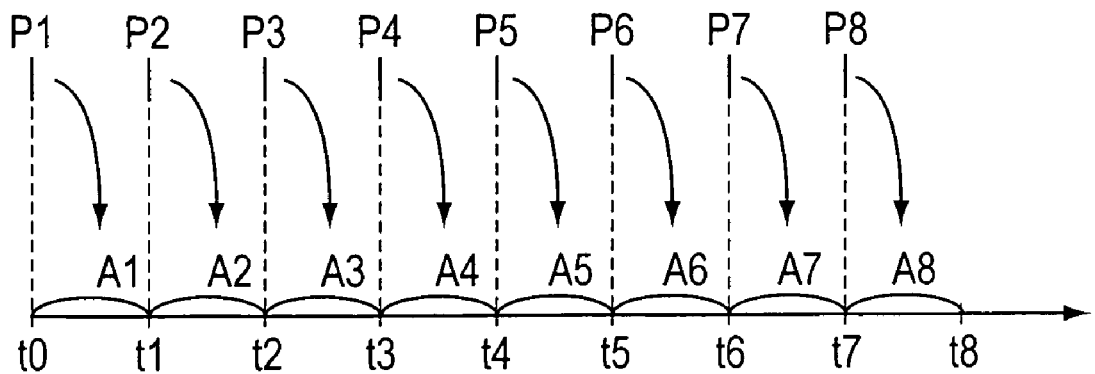
FIG. 7 is a diagram showing that the picture images comprising the continuously shot picture image and the sound have a one-to-one correspondence.

The picture images comprising the continuously shot picture image and the sound have a one-to-one correspondence, for example as shown in FIG. 7. That is, in this drawing, the continuously shot picture image is continuously shot at a rate of 8 frames per second (the time between time t0 and time t8), for example, and during this interval continuously shot picture images P1 through P8 are photographed. Furthermore, the sound A1 corresponding to the picture image P1 is recorded during the interval between time t0 and time t1, and the sound A2 corresponding to the picture image P2 is recorded during the interval between time t1 and time t2. Similarly, the sounds A3 through A8 are recorded.

Accordingly, when the picture image selected in step S1 is, for example, the picture image P5 comprising one of the continuously shot picture images P1 through P8, sound IC 36 reproduces the sound A1 through A8 in order. Regardless of which of the picture images P1 through P8 comprising the continuously shot picture image is selected, sound IC 36 reproduces the sound A1 through A8 in order. When the process of reproducing the sound in step S4 is concluded, the process is completed.

On the other hand, when it is determined in step S3 that the picture image displayed on LCD 6 is not a picture image comprising the continuously shot picture image, the sequence advances to step S5, wherein CPU 34 sends commands to sound IC 36 to reproduce only the sound corresponding to the selected picture image. Sound IC 36 reads only the sound commanded by CPU 34 from memory card 24, executes a decompression process and converts this to an analog sound signal, and then outputs the corresponding sound through speaker 5 or an earphone connected to earphone jack 9. Then, the process is concluded.

Figure 8:
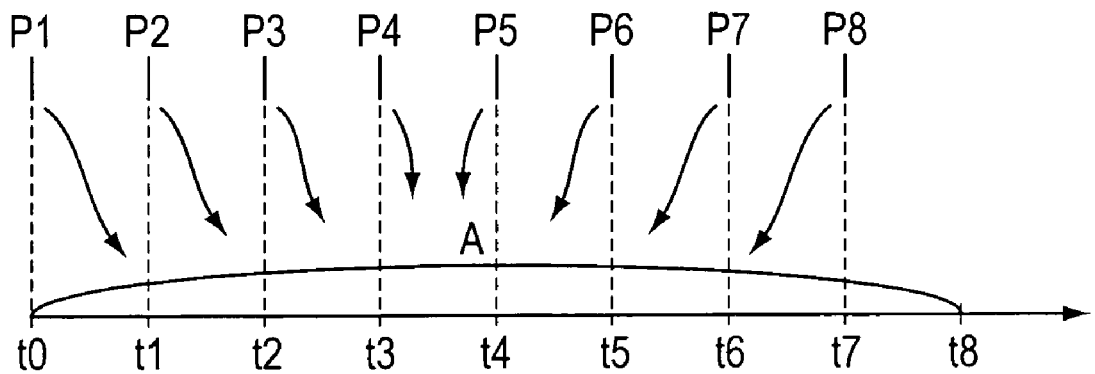
FIG. 8 is a diagram showing that the picture images comprising the continuously shot picture image and the sound have a many-to-one correspondence.

In the above-described embodiment, the case where the sound and picture images comprising a continuously shot picture image have a one-to-one correspondence as shown in FIG. 7 was explained, but as shown in FIG. 8, it is also possible for the continuously shot picture images P1 through P8 and the sound recorded during continuous shooting (in this case, during one second) to have a many-to-one correspondence. Accordingly, the sound A is reproduced when the picture image P5 is selected, for example. That is to say, in this case the sound A is reproduced regardless of which of the picture images P1 through P8 is selected.

In addition, for example in the event that the picture image P5 is selected, when the sound A is silent for example from time t0 through time t4 it is possible to reproduce only the sound from time t4 on. Similarly, when the sound is silent between time t0 and time t2, it is possible to reproduce only the sound from time t2 on. In addition, in cases where there is silence between time t0 and time t5, it is possible to reproduce only the sound from time t5 on, and it is also possible to reproduce the sound starting with time t4, when the picture image P5 was photographed.

In this way, when one of the picture images that comprises the continuously shot picture image continuously shot at a rate of eight frames per second, for example, is selected and this is reproduced and displayed on LCD 6, it is possible to reproduce all of the sound recorded during the continuous shooting time (e.g., one second), and consequently it is possible to eliminate the problem of the reproduction time of the sound corresponding to the picture image displayed on LCD 6 being too short, such as ⅛ of a second, for example, so that recognition is impossible.

In addition, when a portion of the sound is silent, it is possible to not reproduce this portion, and it is also possible to accomplish efficient reproduction of the recorded data.

In addition, in the present embodiment only one microphone was provided, but it is also possible to provide two microphones, on the right and the left, and to record the sound in stereo.

In addition, in the present embodiment the various types of information were input using a pen-type pointing device, but it is also possible to input this information using a finger.

In addition, in the above-described embodiment, it is possible to set the continuous shooting mode to an L mode that photographs eight frames in one second, and an H mode that shoots 30 frames in one second, but this is intended to be illustrative and not limiting, for it is also possible to shoot an arbitrary number of frames per second.

Furthermore, the display screen shown on LCD 6 is only one example, and the screen is not limited to this, for it is possible to use screens with various layouts. Similarly, the types of operation keys and the layout are also merely examples, and are intended to be illustrative and not limiting.

With the information input apparatus of the present invention, when one picture image that comprises the predetermined continuously shot picture image is selected and reproduced, all of the sound corresponding to the continuously shot picture image of which this picture image is a constituent element is reproduced, and consequently it is possible to make it so the user can tell no difference in the sound associated with the reproduced picture image.

What is claimed is:

1. An information input apparatus, comprising:
   an imaging unit configured to image a picture image;
   a sound input unit configured to input sound;
   a memory for storing the picture image imaged by the imaging unit and the sound corresponding to the picture image input by the sound input unit, and for storing a continuously shot picture image comprising a plurality of picture images imaged continuously in a predetermined time period by the imaging unit and a plurality of sounds, each of which corresponds to one of the plurality of continuously imaged picture images, input by the sound input unit;
   a picture image reproduction unit configured to reproduce the picture images stored in the memory;
   a sound reproduction unit configured to reproduce the sound stored in the memory;
   a selection unit configured to select among the picture images stored in the memory; and
   a control unit configured to control the picture image reproduction unit to reproduce the selected picture image and the sound reproduction unit to reproduce the sound corresponding to the continuously shot picture image containing the selected picture image, if the selected image is one image of the continuously shot picture image,
   the control unit accomplishes control so that when one of the picture images other than a first picture image of a range of continuously shot picture images is selected, the sound corresponding to the range of continuously shot picture images is reproduced, beginning with sound of a picture image in the range where audible sound is first recorded, and
   respective picture images of the plurality of picture images obtained through continuous shooting are recorded in correlation to different sounds.

2. The information input apparatus of claim 1, wherein:
   the sound is stored in the memory with an association to each of the picture images that comprise the continuously shot picture image.

3. The information input apparatus of claim 1, wherein:
   the control unit accomplishes control so that when one of the picture images that comprise the continuously shot picture image is selected by the selection unit, the sound reproduction unit reproduces the sound corresponding to the entire continuously shot picture image.

4. The information input apparatus of claim 1, wherein:
   the memory stores predetermined information indicating whether or not a picture image is a picture image comprising a continuously shot picture image.

5. The information input apparatus of claim 1, further comprising:
   a display unit configured to display the picture images imaged by the imaging unit and the picture images reproduced by the picture image reproduction unit; and
   a sound output unit configured to output the sound input by the sound input unit and the sound reproduced by the sound reproduction unit.

6. The information input apparatus of claim 1, further comprising an illumination unit configured to emit illuminating light toward the object.

7. The information input apparatus of claim 1, wherein when the selected picture image is selected, a first audible sound is reproduced regardless of an amount of time delay between the storing of the selected picture image and the storing of an audible sound produced before or after the storing of the selected picture.

8. An information input apparatus, comprising:
an imaging unit for imaging picture images;
a microphone for inputting sound;
a memory for storing the picture images and the sound associated with the picture images, the memory adapted to store a range of continuously shot picture images and a plurality of sounds each of which is associated with one of the continuously shot picture images;
a reproduction unit for reproducing the picture images and the sound stored in the memory;
a user interface for allowing selection of the picture images to be reproduced; and
a controller responsive to the user interface for controlling the reproduction unit to reproduce the selected picture image and the sound associated with the picture image, and, if the selected picture image is one of the range of continuously shot picture images, reproducing the selected picture image and the sound associated with the entire range of the continuously shot picture images,
the controller accomplishes control so that when one of the picture images other than a first picture image of the range of continuously shot picture images is selected, the sound corresponding to the range of continuously shot picture images is reproduced, beginning with sound of a picture image in the range where audible sound is first recorded, and
respective picture images of the picture images obtained through continuous shooting are recorded in correlation to different sounds.

9. The information input apparatus of claim 8, wherein:
the sound is stored in the memory with an association to each of the picture images that comprise the range of continuously shot picture images.

10. The information input apparatus of claim 8, wherein:
the memory stores predetermined information indicating whether or not a picture image is one of the range of continuously shot picture images.

11. The information input apparatus of claim 8, further comprising:
a display for displaying the picture images imaged by the imaging unit and the picture images reproduced by the reproduction unit; and
a speaker outputting the sound input by the unit by the microphone and the sound reproduced by the reproduction unit.

12. The information input apparatus of claim 8, further comprising a strobe for emitting illuminating light toward the object.

13. The information input apparatus of claim 8, wherein said apparatus is an electronic digital camera, and said imaging unit includes a lens and a photoelectric conversion device.

14. The information input apparatus of claim 8, wherein when the selected picture image is selected, a first audible sound is reproduced regardless of an amount of time delay between the storing of the selected picture image and the storing of an audible sound produced before or after the storing of the selected picture.

15. A method for recording and reproducing picture images, comprising the steps of:
imaging a plurality of picture images during a predetermined period;
recording a plurality of sounds each of which is sound associated with one of the plurality of picture images during the predetermined period;
storing the picture images and the sounds each of which is associated with one of the picture images;
selecting among the stored picture images to be reproduced; and
reproducing the selected picture image and the sound recorded during the predetermined period in which the selected image was recorded,
wherein when one of the picture images other than a first picture image of a range of continuously shot picture images is selected, the sound corresponding to the range of continuously shot picture images is reproduced, beginning with sound of a picture image in the range where audible sound is first recorded, and
respective picture images of the plurality of picture images obtained through continuous shooting are recorded in correlation to different sounds.

16. The method of claim 15, wherein:
the sound is stored with an association to each of the picture images recorded during the predetermined period.

17. The method of claim 15, wherein the sound corresponding to the entire predetermined period in which the selected picture image was recorded is reproduced.

18. The method of claim 15, further comprising the step of imaging a single image during a second predetermined period.

19. The method of claim 18, wherein:
the storing step includes storing information indicating whether a picture image is one of a plurality of picture images recorded during the predetermined period or a single picture image recorded during the second predetermined period.

20. The method of claim 15, further comprising:
displaying the picture images and outputting the recorded sound.

21. The method of claim 15, further comprising:
emitting illuminating light toward an object to be imaged.

22. The method of claim 15, wherein said steps are performed by an electronic digital camera.

23. The method of claim 15, further comprising reproducing a first audible sound when the selected picture image is selected, regardless of an amount of time delay between the storing of the selected picture image and the storing of an audible sound produced before or after the storing of the selected picture.

* * * * *